(12) United States Patent
Nakamura

(10) Patent No.: US 9,772,661 B2
(45) Date of Patent: Sep. 26, 2017

(54) ELECTRONIC EQUIPMENT WITH DISPLAY DEVICE

(71) Applicant: FUJIFILM Corporation, Tokyo (JP)

(72) Inventor: Samito Nakamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 15 days.

(21) Appl. No.: 14/732,812

(22) Filed: Jun. 8, 2015

(65) Prior Publication Data

US 2015/0355684 A1    Dec. 10, 2015

(30) Foreign Application Priority Data

Jun. 9, 2014    (JP) .................................. 2014-118606

(51) Int. Cl.
*G06F 1/16* (2006.01)

(52) U.S. Cl.
CPC .......... *G06F 1/1694* (2013.01); *G06F 1/1626* (2013.01); *G06F 1/1656* (2013.01); *G06F 1/1671* (2013.01); *G06F 2200/1636* (2013.01)

(58) Field of Classification Search
None
See application file for complete search history.

(56) References Cited

U.S. PATENT DOCUMENTS 5,432,510 A    7/1995   Matthews
6,828,958 B2 * 12/2004 Davenport .......... G06F 3/03543
                                                        345/163
7,088,342 B2    8/2006   Rekimoto et al.
7,800,592 B2 *  9/2010   Kerr ...................... G06F 1/1626
                                                        345/173
8,674,951 B2    3/2014   Ferren et al.
9,569,023 B2    2/2017   Aitchison et al.
(Continued)

FOREIGN PATENT DOCUMENTS

JP    2003-330611    11/2003
JP    2011-008767     1/2011
(Continued)

OTHER PUBLICATIONS

Extended European Search Report (EESR) Application No. 15171121; dated Oct. 23, 2015.
(Continued)

*Primary Examiner* — Courtney Smith
*Assistant Examiner* — Rashen E Morrison
(74) *Attorney, Agent, or Firm* — Young & Thompson

(57) ABSTRACT

Portable terminal equipment as a mobile telephone includes a display device disposed with a front surface of a housing. A first touch sensor is provided in the display device. A lateral recess is formed in at least one side surface of the housing. A side touch sensor is disposed in the housing in a range including the lateral recess. Preferably, the lateral recess is constituted by plural lateral recesses formed in the one side surface. Also, a state detection device recognizes a lateral recess where contact is detected among the plural lateral recesses by use of the side touch sensor. A disabling device disables the side touch sensor from detecting contact in a lateral recess among the lateral recesses other than the lateral recess where contact is detected, for adaptation to finger operation of one of right and left hands.

9 Claims, 8 Drawing Sheets

(56) References Cited

U.S. PATENT DOCUMENTS

| | | | |
|---|---|---|---|
| 2003/0137802 A1* | 7/2003 | Von Novak | G06F 1/1626 361/679.09 |
| 2005/0012723 A1* | 1/2005 | Pallakoff | G06F 1/1616 345/173 |
| 2005/0135053 A1* | 6/2005 | Carroll | G06F 1/1613 361/679.56 |
| 2005/0219228 A1* | 10/2005 | Alameh | G06F 1/1626 345/173 |
| 2006/0197750 A1* | 9/2006 | Kerr | G06F 1/1626 345/173 |
| 2007/0136064 A1* | 6/2007 | Carroll | G06F 1/1613 704/254 |
| 2007/0247424 A1* | 10/2007 | Jacob | G06F 1/1626 345/158 |
| 2009/0262085 A1 | 10/2009 | Wassingbo et al. | |
| 2009/0295753 A1* | 12/2009 | King | G06F 1/1626 345/174 |
| 2010/0079395 A1* | 4/2010 | Kim | G06F 1/1626 345/173 |
| 2011/0187660 A1* | 8/2011 | Hirata | G06F 3/03547 345/173 |
| 2011/0291945 A1* | 12/2011 | Ewing, Jr. | G06F 1/1686 345/173 |
| 2013/0002566 A1 | 1/2013 | Punke et al. | |
| 2013/0300697 A1* | 11/2013 | Kim | G06F 1/1626 345/173 |
| 2013/0307816 A1* | 11/2013 | Lee | G06F 1/1652 345/174 |
| 2014/0253477 A1* | 9/2014 | Shim | G06F 3/0416 345/173 |
| 2014/0267136 A1* | 9/2014 | Phipps | G06F 3/03547 345/174 |
| 2015/0355797 A1* | 12/2015 | Shinkai | G06F 3/0416 345/173 |

FOREIGN PATENT DOCUMENTS

| | | |
|---|---|---|
| JP | 2011-523115 | 8/2011 |
| JP | 2012-128668 | 7/2012 |
| JP | 3185345 | 8/2013 |
| JP | 2014-052964 | 3/2014 |
| JP | 2014-056461 | 3/2014 |
| JP | 2014-071477 | 4/2014 |
| WO | WO 2012/049942 | 4/2012 |
| WO | 2013/045766 | 4/2013 |

OTHER PUBLICATIONS

European Office Action dated Aug. 10, 2016 in corresponding European Application No. 15171121.5.
European Summons—15171121.5—dated Feb. 1, 2017.
Japanese Office Action dated Sep. 28, 2016 in corresponding Japanese Application No. 2014-118606.

* cited by examiner

| | | PROGRAMS | | |
| --- | --- | --- | --- | --- |
| | | HOME SCREEN IMAGE | MUSIC PLAYER | RADIO BROADCAST RECEPTION |
| TAPPING OF LATERAL RECESS | 25a | RECEIVE CALL | AUTOMATICALLY START NEXT MUSIC | AUTOMATICALLY SELECT CHANNEL |
| | 25b | RECEIVE MAIL | STOP PLAYING | STOP RECEPTION |
| | 25c | INCREASE AUDIO VOLUME | INCREASE AUDIO VOLUME | INCREASE AUDIO VOLUME |
| | 25d | DECREASE AUDIO VOLUME | DECREASE AUDIO VOLUME | DECREASE AUDIO VOLUME |

ELECTRONIC EQUIPMENT WITH DISPLAY DEVICE

CROSS-REFERENCE TO RELATED APPLICATION

This application claims priority under 35 USC 119 from Japanese Patent Application No. 2014-118606, filed 9 Jun. 2014, the disclosure of which is incorporated by reference herein.

BACKGROUND OF THE INVENTION

1. Field of the Invention

The present invention relates to electronic equipment with a display device. More particularly, the present invention relates to electronic equipment of which operation of a touchscreen display device can be simple to prevent errors reliably in manual operation.

2. Description Related to the Prior Art

There is portable terminal equipment or user interface unit or portable electronic equipment or mobile telephone, in which a touchscreen display device is incorporated. Operability of the touchscreen display device is high, because touch on a screen surface with a finger can operate the portable terminal equipment easily in a manual manner. Also, a known type of the portable terminal equipment has a touch sensor or touch pad disposed in a side surface for higher operability, as disclosed in JP-A 2012-128668. Predetermined program events are allocated to predetermined touch positions on the side surface. The touch positions are touched manually to input the program events associated with the touch positions. For example, information is displayed on a display screen according to a program event. Also, a command application is run according to the program event. See U.S. Pat. Pub. No. 2013/0300697.

Usually, the portable terminal equipment of the portable form is carried with a user in a state contained in a bag, pocket or the like, and is taken out for manual use. However, there is a possibility for the user to use the portable terminal equipment even in a limited space, for example, inside a railroad train of a crowded state. Correct use of the portable terminal equipment is highly difficult without taking out of the bag, pocket or the like. The touch sensor of the above description does not have a projecting shape in the manner of a button, switch and the like. The touch positions for inputting the program events cannot be recognized readily, for example, in the course of sending and receiving electronic mails, reception of a telephone call, increasing and decreasing operation for an audio volume.

SUMMARY OF THE INVENTION

In view of the foregoing problems, an object of the present invention is to provide electronic equipment of which operation of a touchscreen display device can be simple to prevent errors reliably in manual operation.

In order to achieve the above and other objects and advantages of this invention, electronic equipment includes a display device disposed with a front surface of a housing. A first touch sensor is provided in the display device. A lateral recess is formed in at least one side surface of the housing. A second touch sensor is disposed in the housing in a range including the lateral recess.

Preferably, the lateral recess is constituted by plural lateral recesses formed in the one side surface. The second touch sensor is disposed in a range including the plural lateral recesses.

Preferably, the lateral recess is positioned for a finger of a hand for holding the housing.

Preferably, the at least one side surface is right and left side surfaces. The lateral recess and the second touch sensor are disposed with each of the right and left side surfaces.

Preferably, furthermore, a state detection device recognizes a lateral recess where contact is detected among the plural lateral recesses by use of the second touch sensor. A disabling device disables the second touch sensor from detecting contact in a lateral recess among the plural lateral recesses other than the lateral recess where contact is detected, for adaptation to finger operation of one of right and left hands.

Preferably, assuming that contact is detected at one lateral recess in the right side surface and at two or more lateral recesses in the left side surface, then the disabling device disables the second touch sensor from detecting contact at a remaining lateral recess among the plural lateral recesses in the right side surface. Assuming that contact is detected at one lateral recess in the left side surface and at two or more lateral recesses in the right side surface, then the disabling device disables the second touch sensor from detecting contact at a remaining lateral recess among the plural lateral recesses in the left side surface.

Preferably, the lateral recess is disposed asymmetrically with reference to the right and left side surfaces.

Preferably, the lateral recess is constituted by plural lateral recesses including at least two lateral recesses formed in one of the right and left side surfaces. One lateral recess is formed in a remaining one of the right and left side surfaces.

Preferably, furthermore, at least one flexible, electrically conductive sheet is incorporated in the housing, for constituting the first and second touch sensors.

Preferably, furthermore, a rear surface is disposed on the housing and opposite to the front surface. A rear recess is formed in the rear surface. A rear touch sensor is disposed in the housing in a range including the rear recess.

Preferably, the electrically conductive sheet further constitutes the rear touch sensor.

Preferably, the electrically conductive sheet is formed in a shape of the front surface and the side surface by thermal processing, and then attached to the housing.

Consequently, operation of a touchscreen display device can be simple to prevent errors reliably in manual operation, because the lateral recess of a side surface of a housing is effective in handling the electronic equipment in a stabilized manner.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
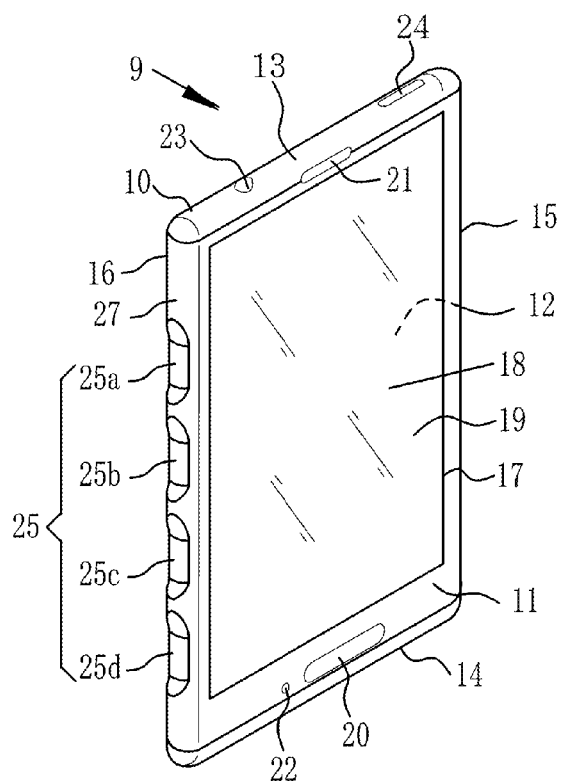
FIG. 1 is a perspective view illustrating portable terminal equipment.

In FIG. 1, portable terminal equipment 9 or user interface unit or portable electronic equipment or mobile telephone of the invention is illustrated. The portable terminal equipment 9 has a function of the telephone for communication. A housing 10 of the portable terminal equipment 9 has a small thickness of a box shape. The housing 10 of a panel type has a front surface 11 and a rear surface 12 with larger areas than other surfaces. Four surfaces connect the front and rear surfaces 11 and 12. The surfaces include an upper surface 13, a lower surface 14, a right side surface 15 and a left side surface 16 as viewed in a vertical posture in the drawing. A display screen 17 of a quadrilateral shape is disposed to constitute the front surface 11. In the vertical posture, longer side lines of the display screen 17 are oriented vertically.

There is a touchscreen display device 18 having the display screen 17. The touchscreen display device 18 has a first touch sensor 19 or a touch sensor pad. Examples of the first touch sensor 19 can be a resistance film type, electrostatic capacitive type, pressure sensitive type and the like.

The display screen 17 displays an initial screen image or home screen image. The home screen image is a desktop image of a personal computer or a home image of a mobile telephone. Various icons are displayed in the home screen image for various applications. One of the icons is tapped so as to run one of the applications linked with the tapped icon. Note that tapping is action of one push with one finger.

The front surface 11 has a start button 20 or TOP button, a speaker 21 and a microphone 22. The start button 20 is a button for returning to the home screen image. The speaker 21 outputs voice of a caller, and music, sound effect or other sound played back by a player program. The microphone 22 detects voice or sound in the course of communication or receiving sound as an input signal. An earphone socket 23 or earphone jack and a power button 24 are disposed on the upper surface 13.

Four lateral recesses 25a, 25b, 25c and 25d are formed in the left side surface 16. The lateral recesses 25a-25d are arranged suitably in positions of an index finger, middle finger, ring finger and little finger of a user's right hand holding the portable terminal equipment 9. A term of a lateral recess group 25 is used herein for a structure with the lateral recesses 25a-25d.

Figure 2:
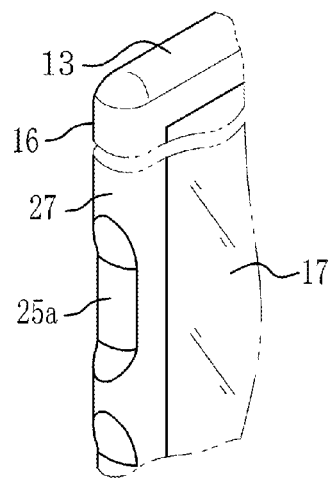
FIG. 2 is a perspective view illustrating a portion of a housing having a lateral recess.

In FIG. 2, the left side surface 16 is illustrated in enlargement. The left side surface 16 is curved convexly. The lateral recess group 25 is formed in a curved portion of the left side surface 16. Note that the number of the recesses in the lateral recess group 25 can be one, two, three or five or more instead of four. Also, the lateral recess group 25 can be shaped differently from that illustrated in FIG. 1, for example, in a U-shape or arcuate shape.

A left side touch sensor 27 or a second touch sensor is disposed in the left side surface 16. The left side touch sensor 27 detects various types of touch of a surface of the lateral recess group 25 with a finger, for example, tapping action of touch in a sufficiently short time. Note that double tapping action of quickly tapping at two times can be used instead of the tapping action. Examples of the left side touch sensor 27 can be a resistance film type, electrostatic capacitive type, pressure sensitive type and the like. The left side touch sensor 27 corresponds to a second touch sensor of the invention.

Figure 3:
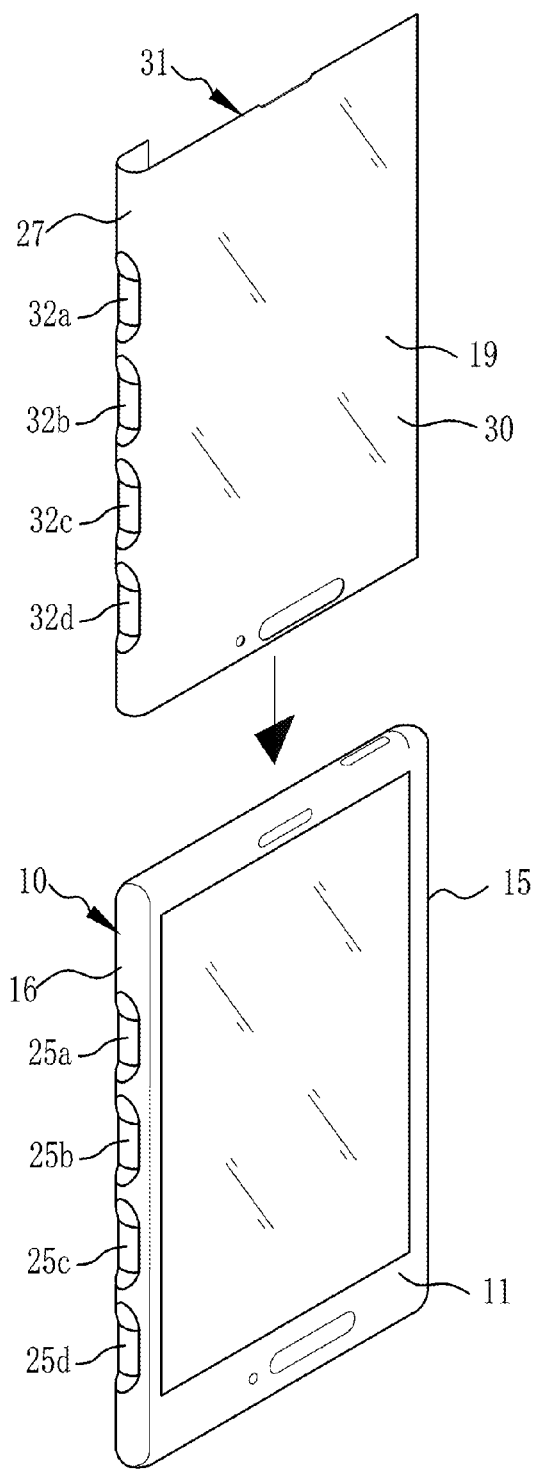
FIG. 3 is a perspective view illustrating a state of attaching an electrically conductive sheet in the portable terminal equipment.

In FIG. 3, the housing 10 and an electrically conductive sheet 31 in the portable terminal equipment 9 are illustrated. The electrically conductive sheet 31 is a single transparent sheet of a large size to extend from the left side surface 16 to the front surface 11 in the housing 10. The electrically conductive sheet 31 has the first touch sensor 19 and the left side touch sensor 27. A plurality of films with conductive patterns are used and laminated together, to constitute the electrically conductive sheet 31 with elasticity (flexibility) and heat shrinkability. At first, a protective sheet 30 is attached to an outer surface of the electrically conductive sheet 31. Then the electrically conductive sheet 31 is thermally shrunken by thermal processing in a shape similar to the left side surface 16 and the front surface 11 in the housing 10, before the electrically conductive sheet 31 is attached to the housing 10 in a fitted manner. To this end, a mold in the same shape as the left side surface 16 and the front surface 11 of the housing 10 is used for the thermal processing. The mold has the shape of the outer surface including the lateral recess group 25. Recess portions 32a, 32b, 32c and 32d of relief forms are transferred to the electrically conductive sheet 31 in the same shape as the lateral recesses 25a-25d.

Note that the electrically conductive sheet 31 may not be the single sheet. A plurality of the electrically conductive sheets 31 can be used discretely for the front surface 11 and the left side surface 16. For this structure, an outer surface of each of the electrically conductive sheets 31 is provided with the protective sheet 30, before the electrically conductive sheet 31 is thermally processed in a form along the left side surface 16. Then the electrically conductive sheet 31 can be attached to respectively the left side surface 16. Furthermore, the electrically conductive sheets 31 can be four associated with the lateral recesses 25a-25d. Preferably, the first touch sensor 19 of the front surface 11 can be transparent for the discrete sheets.

Figure 4:
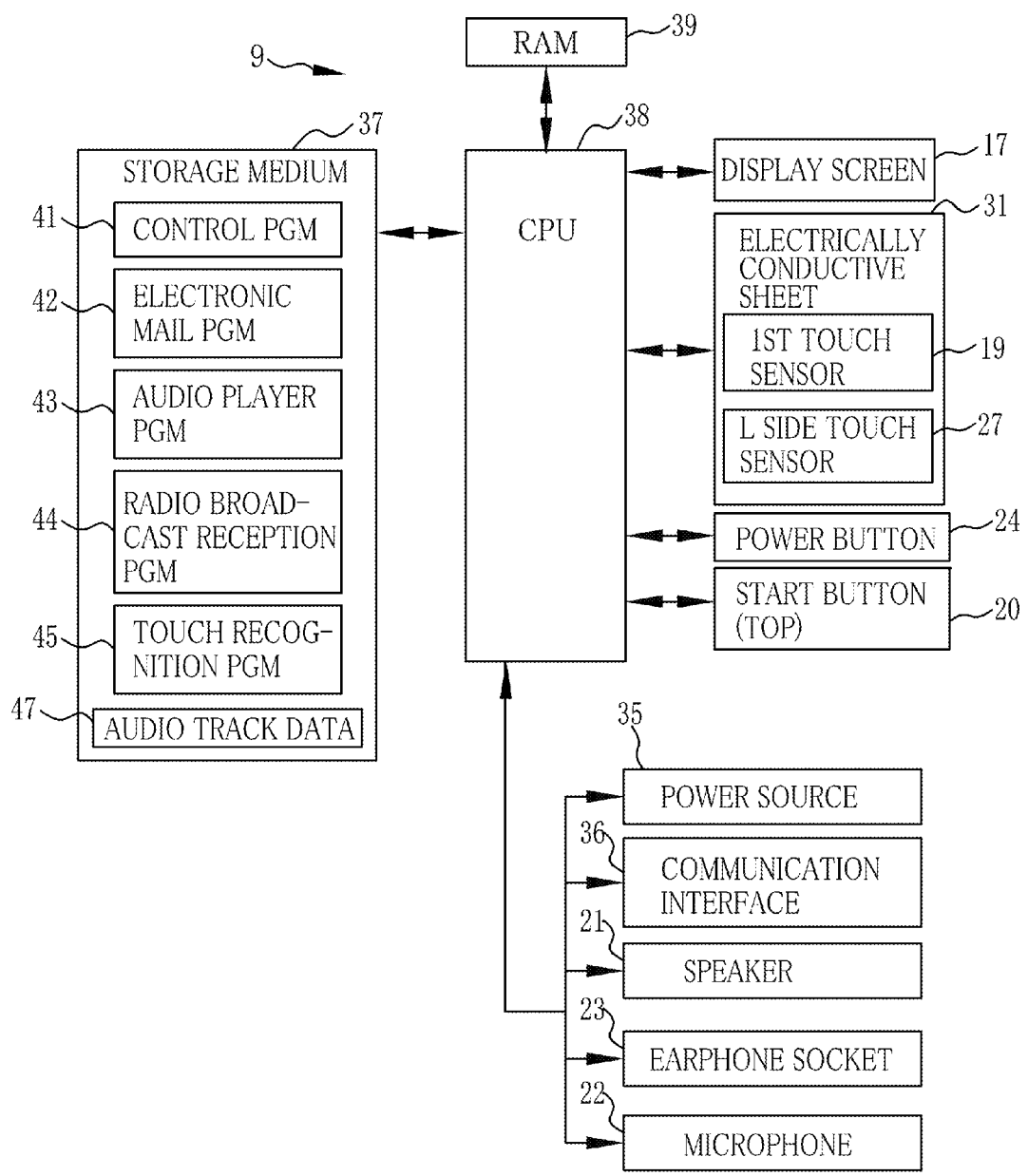
FIG. 4 is a block diagram schematically illustrating the portable terminal equipment.

In FIG. 4, circuit devices in the portable terminal equipment 9 are illustrated. The portable terminal equipment 9 includes the display screen 17, the electrically conductive sheet 31, the start button 20, the power button 24, a power source 35, a communication interface 36, the speaker 21, the microphone 22, the earphone socket 23, a storage medium 37, a CPU 38 (central processing unit), and a RAM 39 (random access memory).

The electrically conductive sheet 31 includes the first touch sensor 19 of the front surface 11 and the left side touch sensor 27. The first touch sensor 19 detects contact information generated by touch of a finger together with position information of the display screen 17, and sends the information to the CPU 38. Examples of action detected on the first touch sensor 19 include tapping action, sweeping action and the like. Examples of the display screen 17 are a liquid crystal display device (LCD device), organic electro luminescence device (organic EL device) and the like for displaying an image or text.

The start button 20 is a pushbutton depressible mechanically, and inputs a depression signal to the CPU 38. The left side touch sensor 27 detects contact information of various manners together with position information of the contact of the contact information, and inputs the information to the CPU 38. The power source 35 is turned on by depression of the power button 24, and supplies various circuit devices including the CPU 38 with power from a storage battery or external power source.

The communication interface 36 has an antenna for wirelessly transmitting and receiving signals in connection with a base station, to perform speech communication and data communication. The speaker 21 outputs sound according to an audio signal from the CPU 38. The earphone socket 23 is a terminal for plug-in of a terminal of an earphone, and outputs sound of the audio signal from the CPU 38. The microphone 22 converts the sound or voice of a caller into the audio signal, and inputs the audio signal to the CPU 38.

Examples of the storage medium 37 are a non-volatile memory or magnetic storage medium, for storing programs and data used in processing in the CPU 38. The programs in the storage medium 37 include a control program 41 or main program, an electronic mail program 42, an audio player program 43 for music, a radio broadcast reception program 44 and a touch recognition program 45. Also, audio track data 47 or music data are stored in the storage medium 37.

The storage medium 37 stores the program of the Operating System (OS) for basic functions of the portable terminal equipment 9 and application programs and data required for the communication interface 36. Also, the storage medium 37 can be constituted by a removable storage medium such as a memory card, and a reader for reading data from the removable storage medium.

The control program 41 is for controlling circuit devices in the portable terminal equipment 9 upon initially starting up the CPU 38. The electronic mail program 42 is an application for sending, receiving and viewing an electronic mail. The audio player program 43 is an application for playing audio track data for music. The radio broadcast reception program 44 is an application for the communication interface 36 to receive radio broadcast content in a form of an audio signal, so as to emit sound or voice. An example of the radio broadcast content can be an IP simultaneous radio broadcast (Internet protocol simultaneous radio broadcast).

The touch recognition program 45 inputs a program event to the CPU 38 according to the contact information detected by the first touch sensor 19 and the left side touch sensor 27. Examples of the contact information are information of positions, time and area of touch of fingers, and more specifically, a position of a tapped one of recesses in the lateral recess group 25 with the left side touch sensor 27. The program event is a signal for performing a particular task predetermined for each of the programs.

The CPU 38 controls functions of the portable terminal equipment 9 including various circuit devices. The CPU 38 refers to various data read out from the storage medium 37 or data developed by use of the RAM 39, performs tasks according to commands in the program read from the storage medium 37, and controls the display screen 17, the communication interface 36 and the like for the functions. Note that programs and data used by the CPU 38 can be downloaded remotely from an external server apparatus by use of wireless communication of the communication interface 36.

The CPU 38 runs the electronic mail program 42 for functions of sending and receiving electronic mails, viewing of received mails, and editing the mails. Also, the CPU 38 runs the audio player program 43 to play the audio track data 47. The CPU 38 runs the radio broadcast reception program 44 to receive radio broadcast content to emit sound or voice according to an audio signal.

The CPU 38 runs the touch recognition program 45 to specify contact information in response to contact of various types detected by the first touch sensor 19 and the left side touch sensor 27, and performs tasks associated with the contact information. Note that plural programs are executable in the CPU 38 simultaneously by a multi-task function provided by the program of the Operating System (OS).

The RAM 39 is a working memory for temporarily storing program code of programs run by the CPU 38, data referred to by the CPU 38, and results of arithmetic operation of the CPU 38.

Figures 5, 6:
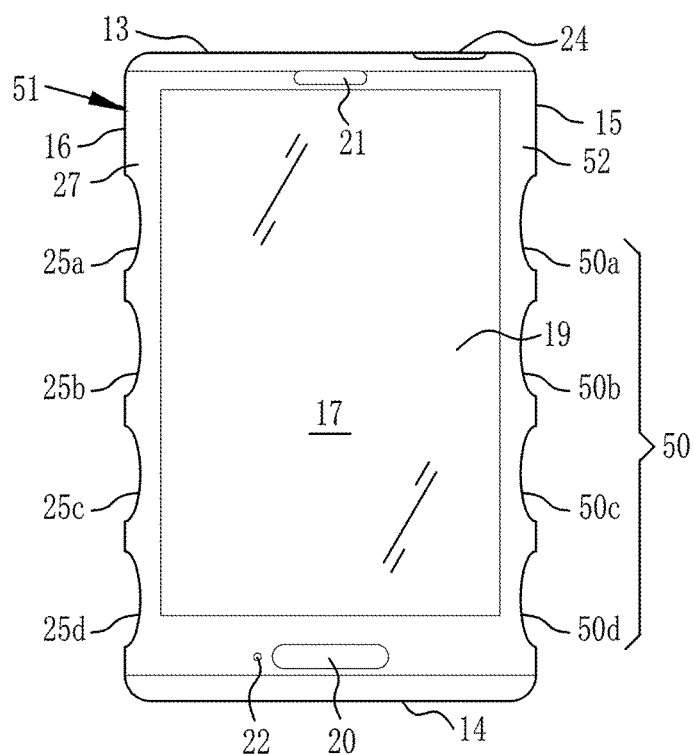
FIG. 5 is a table illustrating a relationship between lateral recesses for tapping and program events of various programs or applications.
FIG. 6 is a front elevation illustrating other preferred portable terminal equipment in which each of side surfaces has plural lateral recesses.

In FIG. 5, a type of the program event predetermined for each program is illustrated in relation to tapping on the lateral recesses 25a-25d. The a type of the program event to be processed is previously registered in the touch recognition program 45, and defined by running of the touch recognition program 45 in the CPU 38. It is possible to construct registration of processing of the program event to the touch recognition program 45 in a manner changeable by a user for each program. Preferably, data for registration of processing of the program event can be stored in the storage medium 37.

The CPU 38 in the state of the initial screen image (home screen image) processes contact information of tapping on the lateral recess 25a as a program event of reception of a telephone call. Also, the CPU 38 processes contact information of the tapping on the lateral recess 25b as a program event of reception of an electronic mail. The CPU 38 processes contact information of the tapping on the lateral recess 25c as a program event of increasing an audio volume. The CPU 38 processes contact information of the tapping on the lateral recess 25d as a program event of decreasing the audio volume.

While the audio player program 43 is run, contact information of tapping the lateral recess 25a is processed by the CPU 38 as a program event of automatic music start to play next music. Contact information of tapping the lateral recess 25b is processed by the CPU 38 as a program event of stopping playing music. Contact information of tapping the lateral recess 25c is processed by the CPU 38 as a program event of increasing an audio volume. Contact information of tapping the lateral recess 25d is processed by the CPU 38 as a program event of decreasing the audio volume.

While the radio broadcast reception program 44 is run, contact information of tapping on the lateral recess 25a is processed by the CPU 38 as a program event of automatic channel selection by changeover to a succeeding broadcast channel. Contact information of tapping on the lateral recess 25b is processed by the CPU 38 as a program event of stopping the broadcast reception. Contact information of tapping on the lateral recess 25c is processed by the CPU 38 as a program event of increasing an audio volume. Contact information of tapping on the lateral recess 25d is processed by the CPU 38 as a program event of decreasing the audio volume.

As a result, tapping with only small movement of the fingers can easily perform desired tasks while the right hand holds the portable terminal equipment 9 in contact of the fingers on the lateral recess group 25. The portable terminal equipment 9 can be manually operated even while contained in a bag, pocket or the like.

Note that it is preferable to display an icon in a balloon form for indicating a type of a program event to be processed near to the position of the tapped recess in the lateral recess group 25 on the display screen 17, so as to clarify the content of the program event corresponding to the lateral recess group 25.

In the above embodiment, the lateral recess group 25 is disposed in the left side surface 16. In contrast with this, other preferred portable terminal equipment 51 or user interface unit or portable electronic equipment or mobile telephone in FIG. 6 includes lateral recesses 50a, 50b, 50c and 50d in the right side surface 15 in addition to the lateral recesses 25a-25d in the left side surface 16. A lateral recess group 50 in the right side surface 15 is symmetric with the lateral recess group 25 in the left side surface 16 in a state of viewing the portable terminal equipment 51 in a front elevation.

A right side touch sensor 52 or a second touch sensor is disposed in the right side surface 15 in a range including the lateral recess group 50. The right side touch sensor 52 inputs contact information to the CPU 38 in relation to the lateral recesses 50a-50d, such as a position of tapping in the lateral recesses 50a-50d. The CPU 38 processes a program event according to the contact information detected by the right side touch sensor 52. A type of the program event to be processed is predetermined for each recess in the lateral recess group 50 in the right side surface 15 according to the program. The right side touch sensor 52 is an example of a second touch sensor. Also, a program event is predetermined for each recess in the lateral recess group 25 in the left side surface 16 according to the program.

Figure 7:
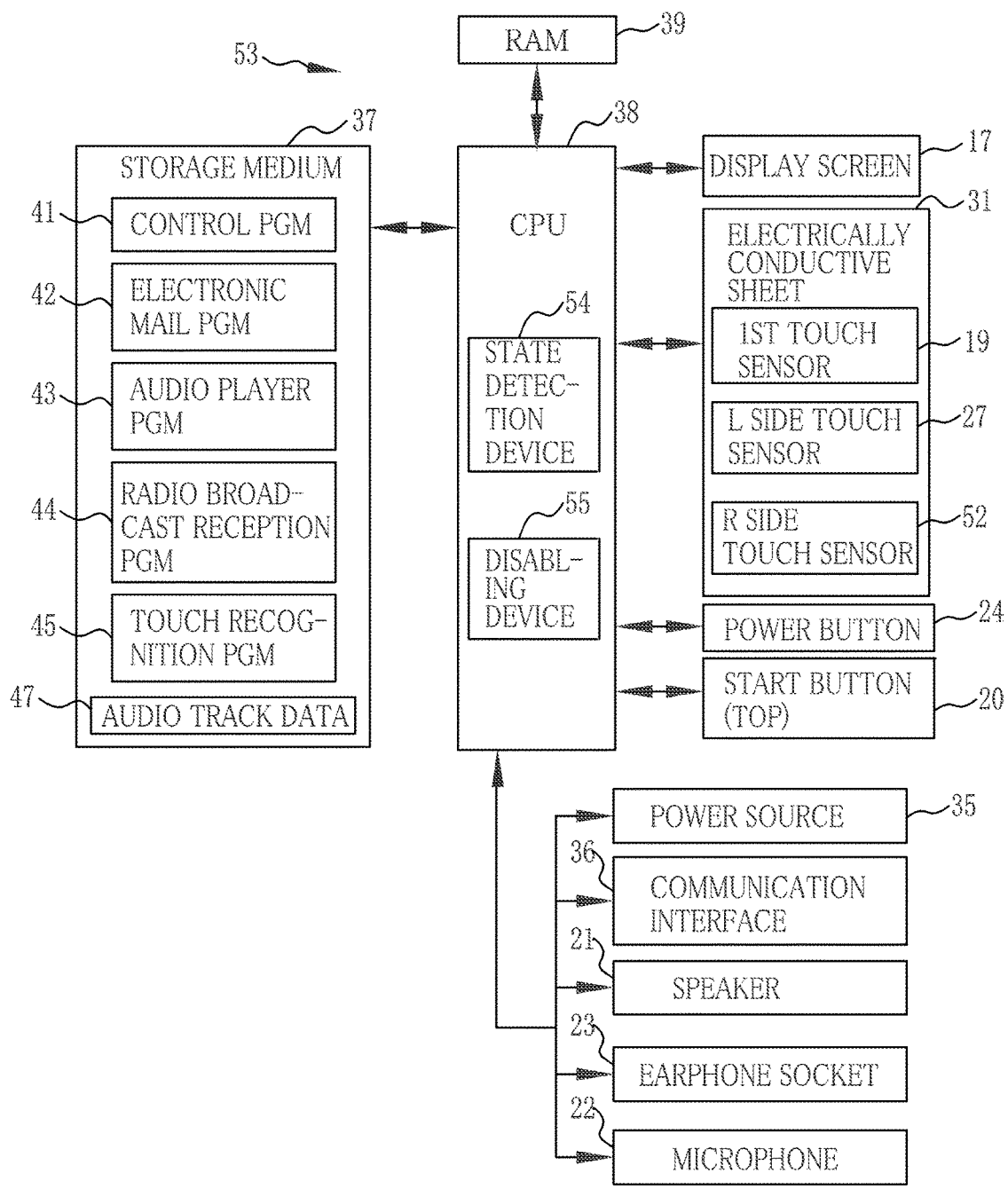
FIG. 7 is a block diagram schematically illustrating the portable terminal equipment.

In FIG. 7, still other preferred portable terminal equipment 53 or user interface unit or portable electronic equipment or mobile telephone is illustrated, in which a state detection device 54 or judgment device and a disabling device 55 are incorporated in the CPU 38. The state detection device 54 in the portable terminal equipment 53 checks which of right and left hands of a user holds the portable terminal equipment 53. The disabling device 55 selectively disables particular recesses in the lateral recess groups 25 and 50 from detecting tapping according to either one of the hands being determined.

The portable terminal equipment 53 includes the lateral recess group 25 in the left side surface 16 and the lateral recess group 50 in the right side surface 15 in FIG. 6. Each of the lateral recess groups 25 and 50 has four recesses. As illustrated in FIG. 7, the state detection device 54 responds to contact information from the left side touch sensor 27 and the right side touch sensor 52, and checks which of right and left hands holds the portable terminal equipment 53 by recognizing positions and number of fingers touching the lateral recess groups 25 and 50. The disabling device 55 responds to an output of the state detection device 54 as to either one of the right and left hands, and disables one or more recesses in the lateral recess groups 25 and 50 from detecting tapping in consideration of not being touched by fingers in the course of holding with the right or left hand.

Assuming that the state detection device 54 recognizes the holding with the right hand, the disabling device 55 enables the lateral recesses 25a-25d in the left side surface 16 and the lateral recess 50a in the right side surface 15 to detect tapping, the lateral recesses 25a-25d being for touch of four right fingers from the index finger to the little finger, the lateral recess 50a being for touch of the right thumb. The disabling device 55 disables the lateral recesses 50b-50d nearer to the lower surface 14 from detecting tapping in the right side surface 15.

Assuming that the state detection device 54 recognizes the holding with the left hand, the disabling device 55 enables the lateral recesses 50a-50d in the right side surface 15 and the lateral recess 25a in the left side surface 16 to detect tapping, the lateral recesses 50a-50d being for touch of four left fingers from the index finger to the little finger, the lateral recess 25a being for touch of the left thumb. The disabling device 55 disables the lateral recesses 25b-25d nearer to the lower surface 14 from detecting tapping in the left side surface 16. Consequently, processing of the program event is not performed even upon inadvertently touching recesses in the lateral recess groups 25 and 50 in the course of holding with the available one of the hands without placement of fingers. Errors in using the portable terminal equipment 53 can be prevented. Note that it is possible to disable the lateral recess groups 25 and 50 not only entirely but also partially for the purpose of disabling detection of tapping in view of placement of fingers.

Figure 8:
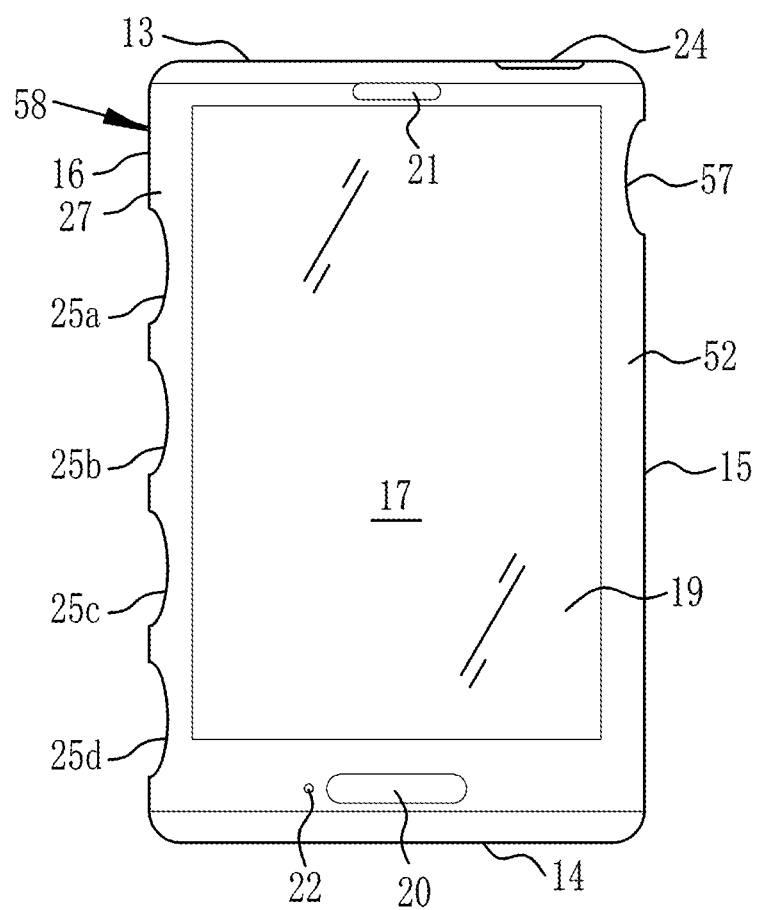
FIG. 8 is a front elevation illustrating still other portable terminal equipment including a lateral recess for a thumb and an array of lateral recesses for four fingers.

In FIG. 8, other preferred portable terminal equipment 58 or user interface unit or portable electronic equipment or mobile telephone is illustrated, in which a lateral recess 57 is formed in an asymmetric manner with reference to the lateral recess group 25. The lateral recess 57 in the right side surface 15 is single. A user holding the portable terminal equipment 58 with the lateral recess 57 can recognize a forward orientation or backward orientation of the portable terminal equipment 58. The lateral recess 57 is disposed suitably for placement of a right thumb in the course of holding with the right hand. The right side touch sensor 52 is disposed in the right side surface 15 in a range including the lateral recess 57. Also, the left side touch sensor 27 is disposed in the left side surface 16 in a range including the lateral recess group 25.

An asymmetric form of the invention can be other forms, such as one defined by inverting the form of the portable terminal equipment 58 of FIG. 8 in a mirror inversion. Also, an example for operating the lateral recess 57 can be a touch on the lateral recess 57, particularly, in a brief manner of the right thumb from a state separate from the lateral recess 57 of the right side surface 15. Namely, the manual touch can be a form similar to a touch of a shift key of a keyboard so as to allocate other program events to the lateral recess group 25 of the left side surface 16 in a temporary manner.

Figure 9:
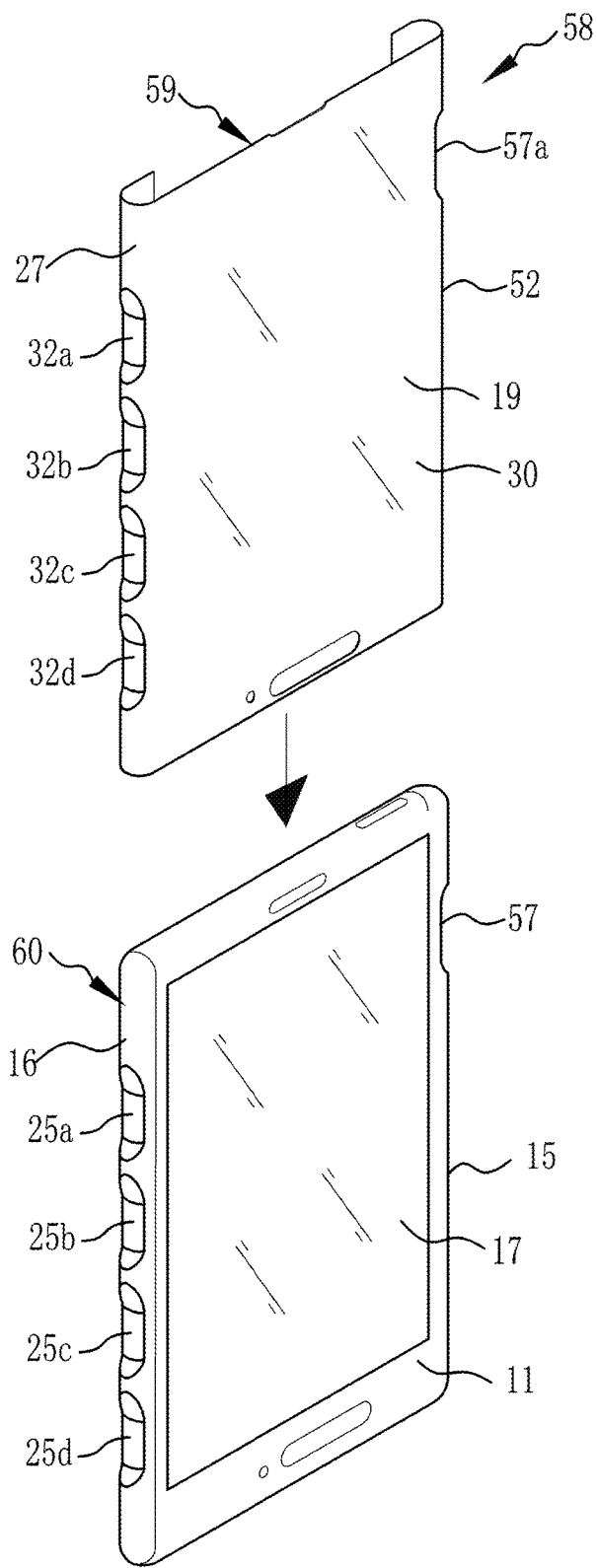
FIG. 9 is a perspective view illustrating a state of attaching an electrically conductive sheet in the portable terminal equipment.

In FIG. 9, a housing 60 and an electrically conductive sheet 59 in the portable terminal equipment 58 are illustrated. The electrically conductive sheet 59 is a single transparent sheet of a large size to extend from the left side touch sensor 27 to the first touch sensor 19 and the right side touch sensor 52. The electrically conductive sheet 59 has the first touch sensor 19, the left side touch sensor 27 and the right side touch sensor 52. A plurality of films with conductive patterns are used and laminated together, to constitute the electrically conductive sheet 59 with elasticity (flexibility) and heat shrinkability. In a manner similar to the structure of FIG. 3, the protective sheet 30 is attached to an outer surface of the electrically conductive sheet 59. Then the electrically conductive sheet 59 is thermally shrunken by thermal processing in a shape similar to the left side surface 16, the front surface 11 and the right side surface 15 of the housing 60, before the electrically conductive sheet 59 is attached to the housing 60 in a fitted manner. To this end, a mold in the same shape as the surface of the housing 60 having the lateral recess group 25 and the lateral recess 57 is used for the thermal processing. A recess portion 57a and the recess portions 32a-32d in relief forms are transferred to the electrically conductive sheet 31 in a manner similar to the lateral recess group 25 and the lateral recess 57.

In the portable terminal equipment 51 of FIG. 6, an electrically conductive sheet with the right side touch sensor 52 is used in a manner similar to FIG. 9. A shape of the lateral recess group 50 is transferred to a right side surface of the electrically conductive sheet.

Figure 10:
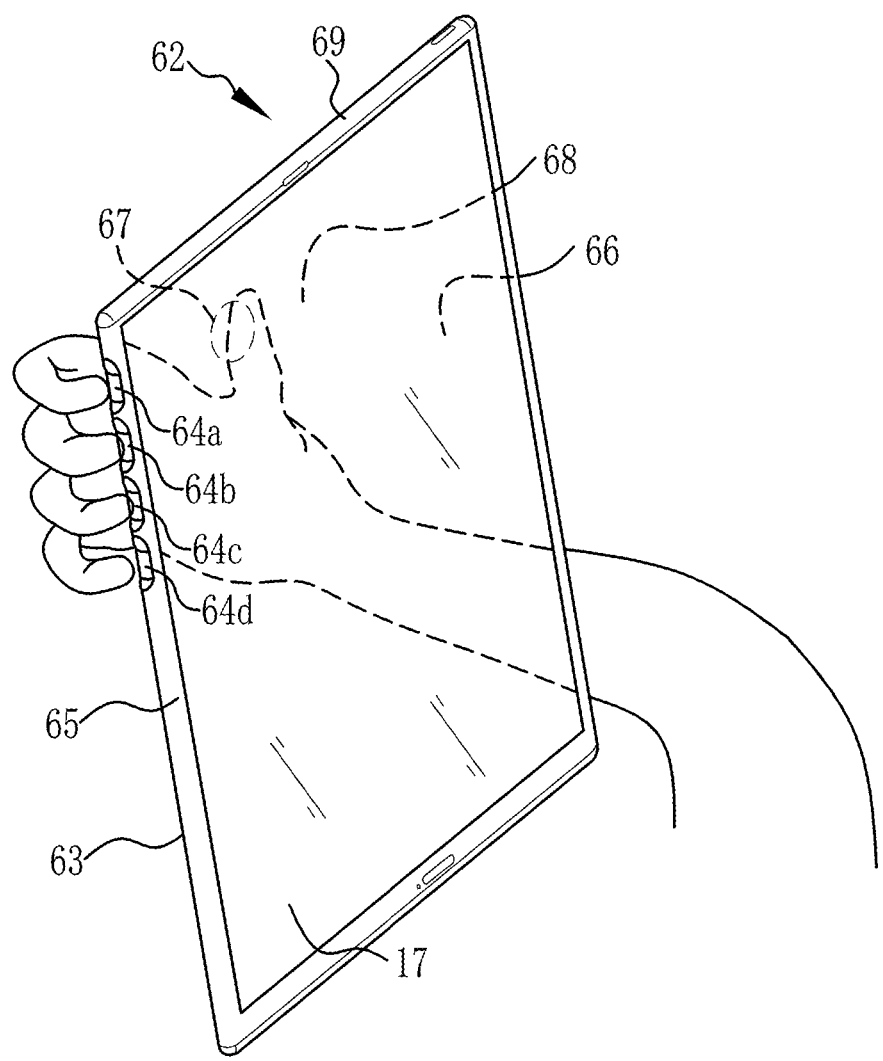
FIG. 10 is a perspective view illustrating a tablet apparatus including a rear recess for a thumb and an array of lateral recesses for four fingers.

In FIG. 10, a tablet apparatus 62 or tablet computer device of an A4 size is illustrated as an example of portable terminal equipment (portable electronic equipment). The tablet apparatus 62 has a left side surface 63 and four lateral recesses 64a, 64b, 64c and 64d formed in the left side surface 63. A lateral recess group of the lateral recesses 64a-64d is arranged for touch of four right fingers from the index finger to the little finger in the course of holding. As the size of the tablet apparatus 62 is large, the lateral recesses 64a-64d are disposed near to an upper surface 69 in the left side surface 63. A left side touch sensor 65 or a second touch sensor is disposed in the left side surface 63 in a range including the lateral recesses 64a-64d. Also, the tablet apparatus 62 includes a rear surface 66 and a rear recess 67 formed in the rear surface 66. A position of the rear recess 67 is predetermined suitably for touch of a right thumb of a right hand in the course of holding. A rear touch sensor 68 or a third touch sensor is disposed in the rear surface 66 in a range including the rear recess 67.

The rear recess 67 of the rear surface 66 is allocated with a program event different from the program event allocated to the lateral recesses 64a-64d of the left side surface 63. Note that the rear recess 67 of the rear surface 66 can be in a form similar to a shift key of a keyboard so as to allocate other program events to the lateral recesses 64a-64d of the left side surface 63 in a temporary manner.

Note that the lateral recesses 64a-64d are formed near to the upper surface 69 in the left side surface 63, and the rear recess 67 is formed near to a corner between the left side surface 63 and the upper surface 69. However, lateral recesses and a rear recess are not limited to the example, but can be formed differently, for example, near to the center of the tablet apparatus 62. It is possible to construct the tablet apparatus 62 in various sizes, so that positions of the lateral recesses and a rear recess can be determined in a suitably modified manner for the purpose.

Furthermore, the features of two or more of the above embodiments can be combined together. For example, at least one recess can be formed in each one of the right side surface, left side surface and rear surface, so that the touch sensors can detect contact in the recesses.

In the above embodiments, the electronic equipment is the mobile telephone or tablet computer device. However, electronic equipment or user interface unit of the invention is not limited to the mobile telephone or tablet computer device. Examples of the electronic equipment are PHS (personal handy-phone system), PDA (personal digital assistant), portable navigation device, personal computer, game machine, electronic book reader, input device for a computer of an installed type, remote control device, various portable devices of an analog arrangement, and the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. Electronic equipment comprising:
a display device disposed with a front surface of a housing;
a first touch sensor provided in said display device;
a plurality of lateral recesses formed in at least one side surface of said housing, the lateral recesses being positioned for a finger of a hand for holding said housing, the at least one side surface being right and left side surfaces;
at least one second touch sensor disposed in said housing in a range including the lateral recesses;
a state detection device configured to recognize one of the lateral recesses at which contact is detected among the plurality of lateral recesses by the at least one second touch sensor; and
a disabling device configured to disable the second touch sensor from detecting contact in another lateral recess among the plurality of lateral recesses other than the lateral recess where contact is detected, for adaptation to a finger operation of one of right and left hands of a user,
wherein the lateral recesses and the at least one second touch sensor are disposed at each of the right and left side surfaces,
wherein the plurality of lateral recesses include at least two lateral recesses formed in one of said right and left side surfaces, and one lateral recess formed in a remaining one of said right and left side surfaces, and
wherein said one lateral recess formed in the remaining one of said right and left side surfaces is allocated with a program event different from the program event allocated to said at least two lateral recesses formed in the one of said right and left side surfaces to temporarily allocate other program events to said at least two lateral recesses when the one lateral recess is engaged.

2. The electronic equipment as defined in claim 1, wherein said second touch sensor is disposed in a range including said plurality of lateral recesses.

3. The electronic equipment as defined in claim 1, wherein when contact is detected at one of the lateral recesses in said right side surface and at two or more of the lateral recesses in said left side surface, said disabling device disables said second touch sensor from detecting contact at a remaining lateral recess among said plurality of lateral recesses in said right side surface, and
when contact is detected at one of the lateral recesses in said left side surface and at two or more of the lateral recesses in said right side surface, then said disabling device disables said second touch sensor from detecting contact at a remaining lateral recess among said plurality of lateral recesses in said left side surface.

4. The electronic equipment as defined in claim 1, wherein said lateral recess is disposed asymmetrically with reference to said right and left side surfaces.

5. The electronic equipment as defined in claim 1, further comprising at least one flexible, electrically conductive sheet, incorporated in said housing, to constitute said first and second touch sensors.

6. The electronic equipment as defined in claim 5, further comprising:
a rear surface disposed on said housing and opposite to said front surface;
a rear recess formed in said rear surface; and
a rear touch sensor disposed in said housing in a range including said rear recess.

7. The electronic equipment as defined in claim 6, wherein said electrically conductive sheet further constitutes said rear touch sensor.

8. The electronic equipment as defined in claim 5, wherein said electrically conductive sheet is formed in a shape of said front surface and said side surface by thermal processing, and then attached to said housing.

9. Electronic equipment comprising:
- a display device disposed with a front surface of a housing;
- a first touch sensor provided in said display device;
- a plurality of lateral recesses formed in at least one side surface of said housing, the lateral recesses being positioned for a finger of a hand for holding said housing, the at least one side surface being right and left side surfaces;
- a rear surface disposed on said housing and opposite to said front surface;
- a rear recess formed in said rear surface; and
- a rear touch sensor disposed in said housing in a range including said rear recess;
- at least one second touch sensor disposed in said housing in a range including the lateral recesses;
- a state detection device configured to recognize one of the lateral recesses at which contact is detected among the plurality of lateral recesses by the at least one second touch sensor;
- a disabling device configured to disable the second touch sensor from detecting contact in another lateral recess among the plurality of lateral recesses other than the lateral recess where contact is detected, for adaptation to a finger operation of one of right and left hands of a user;
- wherein the lateral recesses and the at least one second touch sensor are disposed at each of the right and left side surfaces, and
- wherein said rear recess is allocated with a program event different from the program event allocated to said lateral recesses in a form of a shift key of a keyboard to temporarily allocate other program events to said lateral recesses when the rear recess is engaged.

* * * * *